(12) United States Patent
Velez

(10) Patent No.: US 6,857,212 B2
(45) Date of Patent: Feb. 22, 2005

(54) VISUAL DISPLAY UNIT

(76) Inventor: Michael Velez, 1025 SE. 5th St., Hialeah, FL (US) 33010

(*) Notice: Subject to any disclaimer, the term of this patent is extended or adjusted under 35 U.S.C. 154(b) by 0 days.

(21) Appl. No.: 10/222,147

(22) Filed: Aug. 16, 2002

(65) Prior Publication Data
US 2003/0066220 A1 Apr. 10, 2003

Related U.S. Application Data

(60) Provisional application No. 60/313,093, filed on Aug. 18, 2001.

(51) Int. Cl.[7] .............................................. G09F 13/18
(52) U.S. Cl. ......................................... 40/546; 362/31
(58) Field of Search .............................. 40/546; 362/31

(56) References Cited

U.S. PATENT DOCUMENTS

| | | | | |
|---|---|---|---|---|
| 4,435,743 A | * | 3/1984 | Plumly | 362/31 |
| 5,027,258 A | * | 6/1991 | Schoniger et al. | 362/31 |
| 5,276,591 A | * | 1/1994 | Hegarty | 362/31 |
| 5,640,792 A | * | 6/1997 | Smith et al. | 40/546 |
| 5,829,177 A | * | 11/1998 | Hjaltason | 40/546 |
| 6,241,369 B1 | * | 6/2001 | Mackiewicz | 362/31 |
| 6,305,109 B1 | * | 10/2001 | Lee | 40/546 |
| 6,471,388 B1 | * | 10/2002 | Marsh | 362/31 |
| 6,481,130 B1 | * | 11/2002 | Wu | 40/546 |
| 6,539,657 B1 | * | 4/2003 | Qualls et al. | 40/546 |
| 2002/0157292 A1 | * | 10/2002 | Landers et al. | 40/546 |

FOREIGN PATENT DOCUMENTS

GB 2030750 A * 4/1980 ........... G09F/13/18

* cited by examiner

Primary Examiner—Gary C. Hoge
(74) Attorney, Agent, or Firm—Stephen Glazer

(57) ABSTRACT

A visual display unit comprising a panel and housing with said housing enclosed by an aluminum extrusion, said extrusion houses at least one printed circuit board and light emitting diodes which are attached to said at least one printed circuit board, said light emitting diodes are insulated and attached to said at least one printed circuit board, a bracket and junction box are attached to said aluminum extrusion, with power coming through said junction box, sealant is used between said aluminum extrusion and said panel, light is projected through said panel and reflected out.

12 Claims, 5 Drawing Sheets

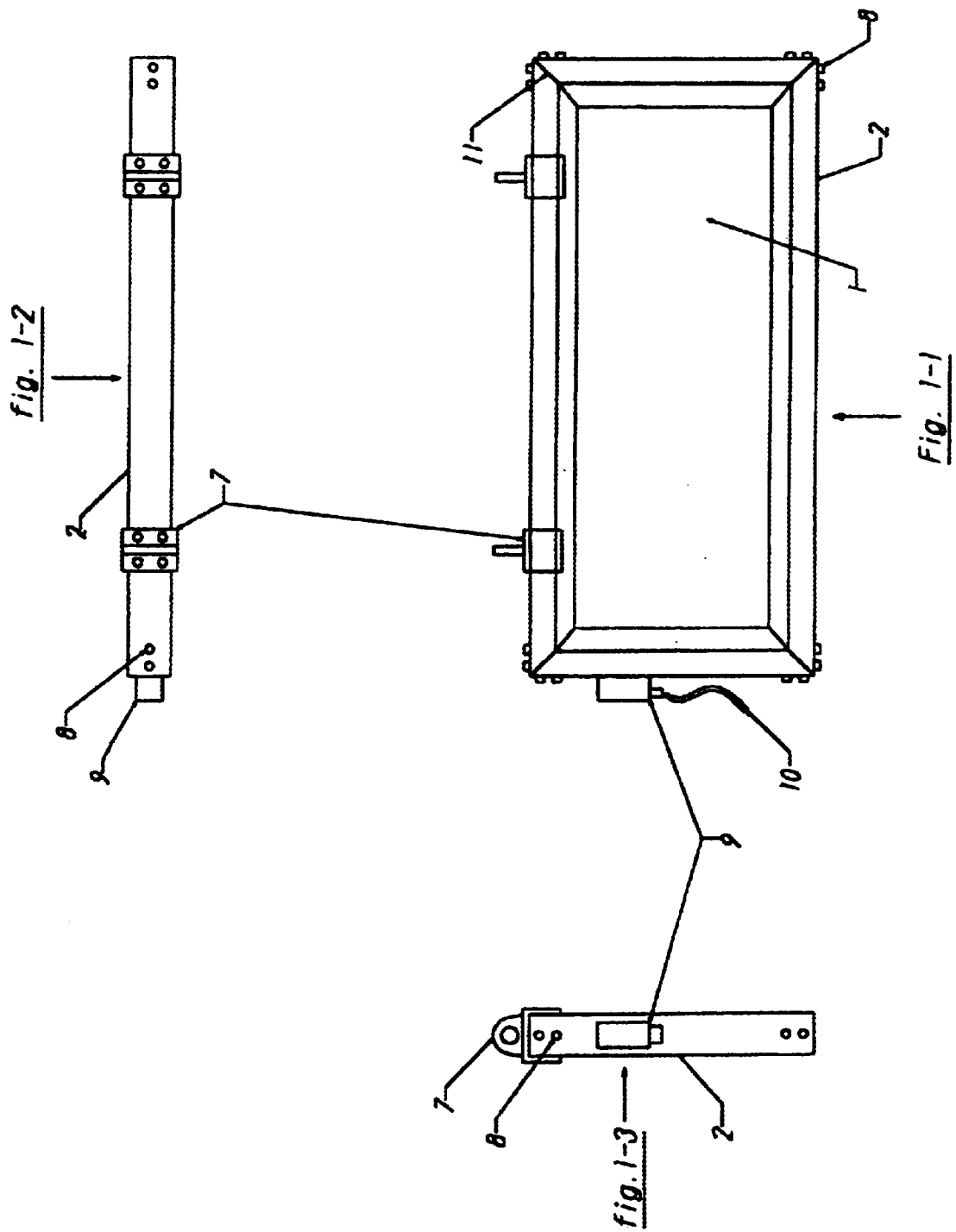

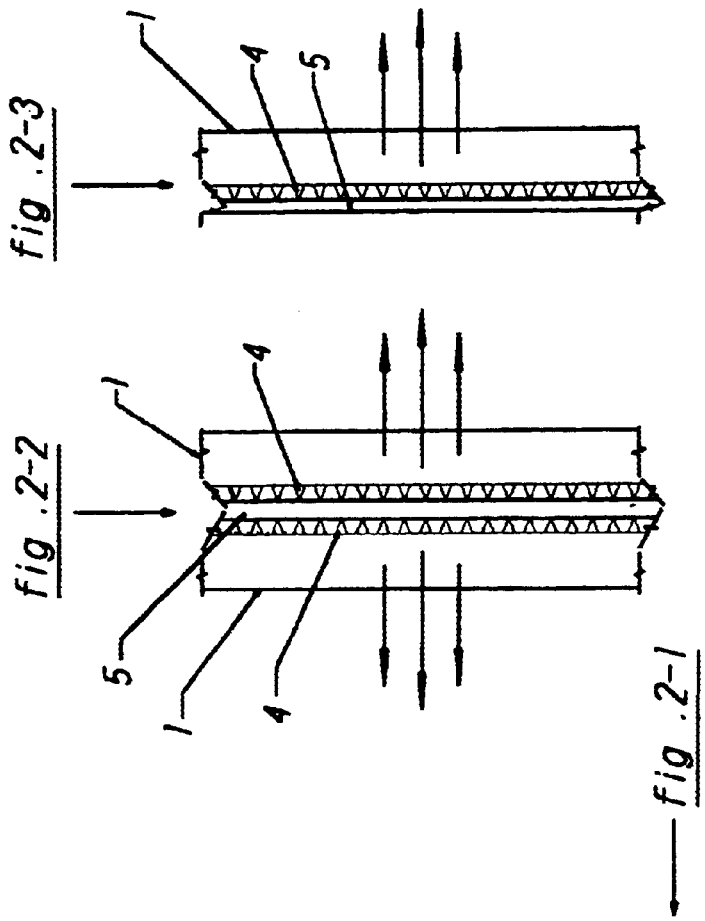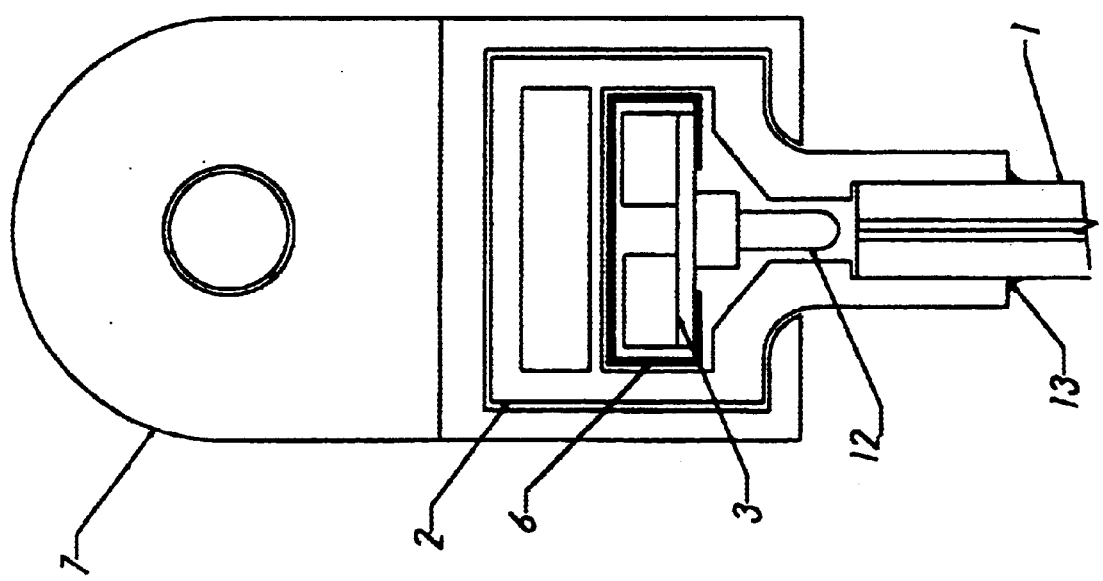

VISUAL DISPLAY UNIT

CROSS REFERENCE TO RELATED APPLICATIONS

This application is claiming the benefit and filing date of the previously filed provisional application with the application No. 60/313,093, filed on Aug. 18,2001.

FEDERALLY SPONSORED RESEARCH

Not Appllicable

SEQUENCE LISTING

Not Appllicable

FIELD OF INVENTION

This invention relates to illuminated signs.

BACKROUND

In streets, public places and buildings, signs are installed to provide people with directions or advertise a product or service.

Typically these signs consist of thick heavy and hollow boxes that sometimes are difficult and cumbersome to install. Since the boxes are hollow, they have frequent problems with wind breakage and water leakage. These boxes are illuminated from the inside out. Inside the boxes, fluorescent lamps or other bright lamps are placed and their light is projected to the outside of the box, therefore illuminating the street name or number, or the advertisement.

The light source requires a heavy use of power. Also the installation and maintenance is expensive, with frequent reparations and replacement of lamps, due to their limited duration.

The advantages of the visual display unit is that the light is projected thorough the edges and reflected out. This allows the sign to be manufactured as a thin and lightweight sign that is easy to install and is resistant to windy conditions and watertight.

The installation of this type of sign will be quick and inexpensive.

Also this new sign uses a small amount of power, compared to a traditional fluorescent sign, therefore, this new sign can be used with batteries or solar power systems. The type of light source used by this sign will ensure long usage before any repair or maintenance is done.

SUMMARY

It is the object of this invention to provide a sign that uses light emitting diodes as a source of light. It is another object of this invention to project the light from the light emitting diode through the edge of the panel sign. The light is projected out, by first deflecting the light projected through the edge to a reflective material positioned behind the panel, the deflected light strikes the reflective material and projects outside the panel.

DRAWINGS—FIGURES

FIG. 1-1. Represents a front view of the sign.

FIG. 1-2 Represents a top view of the sign

FIG. 1-3 Represents a side view of the sign

FIG. 2-1 Represents a sectional view of the sign, containing the panel and the aluminum extrusion frame.

FIG. 2-2 Represents a sectional view of a double side panel.

FIG. 2-3 Represents a sectional view of a single side panel.

FIG. 3-1 Represents a view of the acrylic panel.

FIG. 3-2 Represents a close view of the prismatic pattern printed in the back of the acrylic panel.

FIG. 3-3 Represents a view of the acrylic panel with a reflective film attached to the printed area.

FIG. 3-4 Represents a side view of an acrylic panel indented on one side and diagramming the reflection system.

FIG. 3-5 Represents a side view of an acrylic panel with a reflective paint applied to the indented area.

FIG. 4-1 Represents an illuminated sign used to project light to a bus shelter advertising box.

FIG. 4-2 Represents a sectional view of the illuminated sign in a shelter box.

Figures 2, 3:
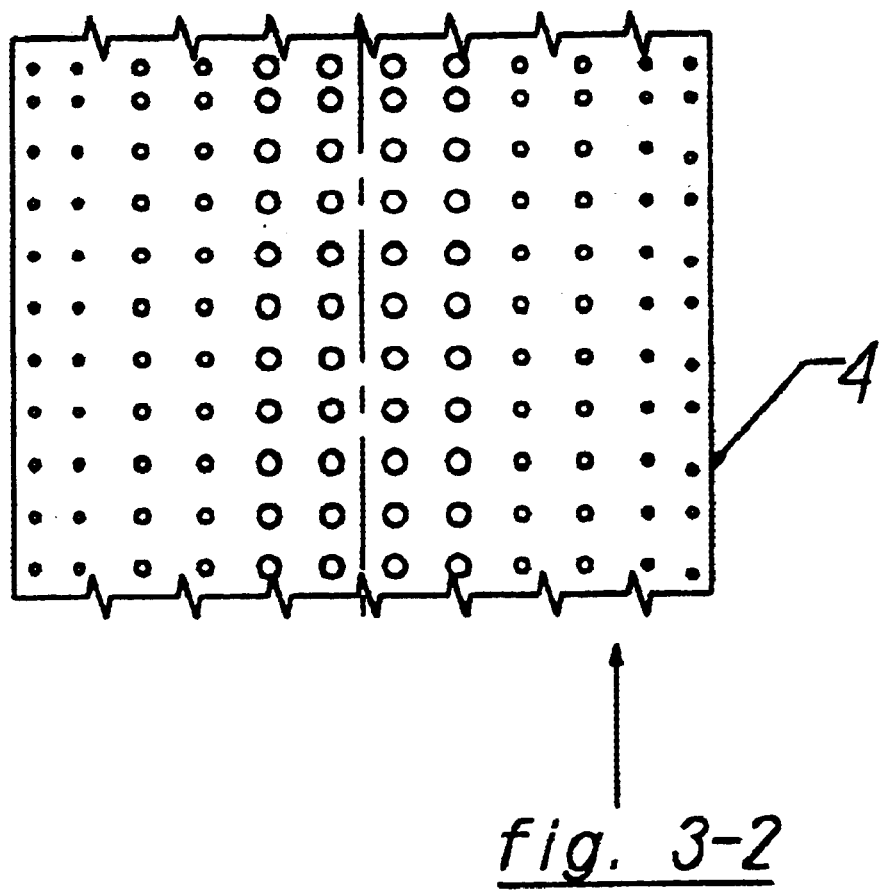

DRAWINGS—Reference Numerals 1 panel
2 extrusion
3 printed circuit board
4 prismatic printed area
5 film
6 insulating channel
7 bracket
8 bolts
9 junction box
10 power source
11 gasket
12 light emitting diodes
13 sealant
14 indented panel
15 reflective coating

DETAILED DESCRIPTION

Figures 1, 3:
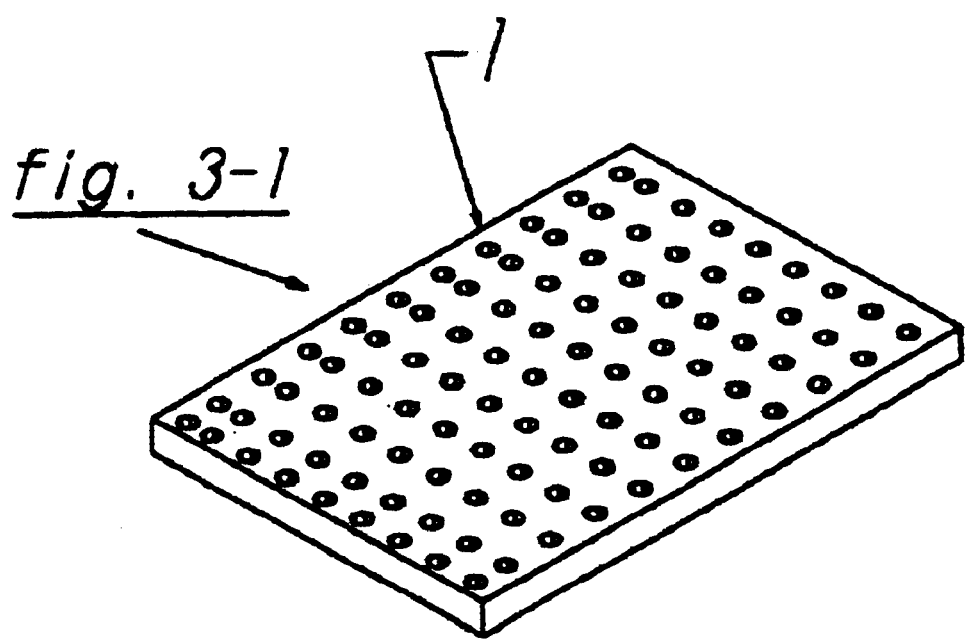

As shown in FIG. 1-1 the light is reflected out of the panel (1). The panel (1) is enclosed by an aluminum extrusion (2). The aluminum extrusion (2) houses the printed circuit boards PCB's (3) with the light emitting diodes LED's (12) as shown in FIG. 2-1. The light emitting diodes are insulated from any contact with the metal of the extrusion channel (2). The insulating channel (6) made out of plastic wraps around the printed circuit boards (3) and prevents them from touching the metal creating short circuit.

To hang or attach the sign to a pole, a bracket (7) is attached to the aluminum extrusion (2) as shown in FIG. 1-1 and 2-3. Also to connect the aluminum extrusion sides, bolts (8) are used on each side of the sign. A junction box (9) is attached to the side of the aluminum extrusion (2). All the connections from the printed circuit boards (3) terminate at the junction box (9). The power from the outside (10) comes through the junction box (9). The junction box (9) contains a fuse to prevent short circuits or power surge. To prevent water from entering the sign at the corners of the sign, a gasket (11) is placed in each corner.

Light from the light emitting diodes (12) FIG. 2-1 is projected through the edge of the acrylic panel (1).

The light emitting diodes (12) are attached to the printed circuit boards (3) and housed outside the sign. To prevent water from entering into the sign, a sealing compound (13)

is placed between the aluminum housing extrusion (2) and the acrylic panel (1).

Light from the light emitting diodes (12) can be projected through a double sided acrylic panel (1) as shown in FIG. 2-2 or through a single side panel as shown in FIG. 2-3. A single side panel has one clear translucent acrylic panel (1) which includes a printed prismatic pattern and a reflective coating on the back of the panel. A double sided panel has two clear translucent acrylic panels (1) with a printed prismatic pattern and a reflective coating on the back of each panel. Each panel also has a film (5) that covers the printed side. This film is used to protect the printed area and to prevent seeing through the back side of the panel. The coating used to print the prismatic pattern is a reflective coating, and this printed prismatic pattern is created by using the reflective coating. The printed pattern is designed in a manner that the solid dotted prismatic area increases in size as it gets further from the two opposing outer edges, as shown in FIG. 3-2. This printed prismatic pattern (4) allows the light to be incrementally intercepted and reflected as it gets further from the edges, so that the panel is illuminated evenly, creating an effect similar to a panel that is illuminated from the back or front. This will allow the light to be reflected outside of the acrylic panel (1).

Figures 3, 4, 5:
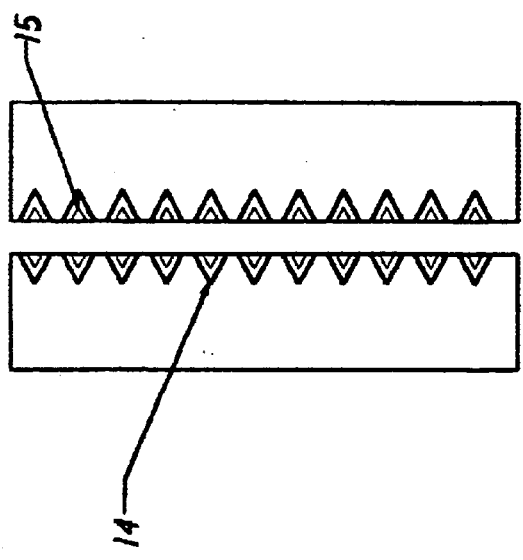
Figure 3:
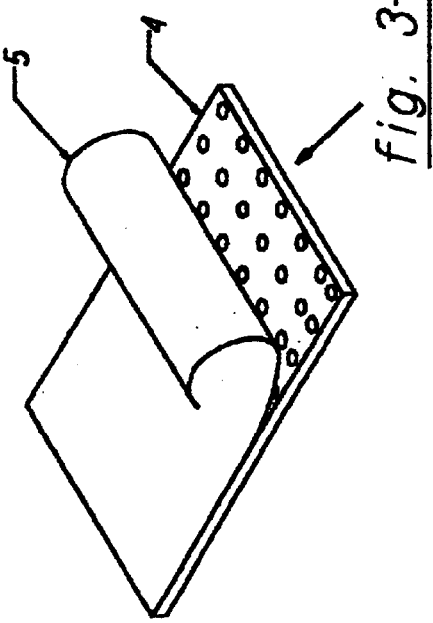
Figures 3, 4:
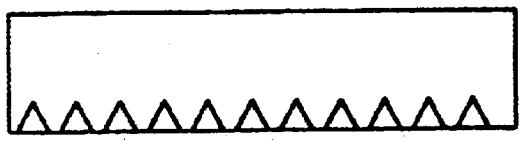
Figures 2, 4:
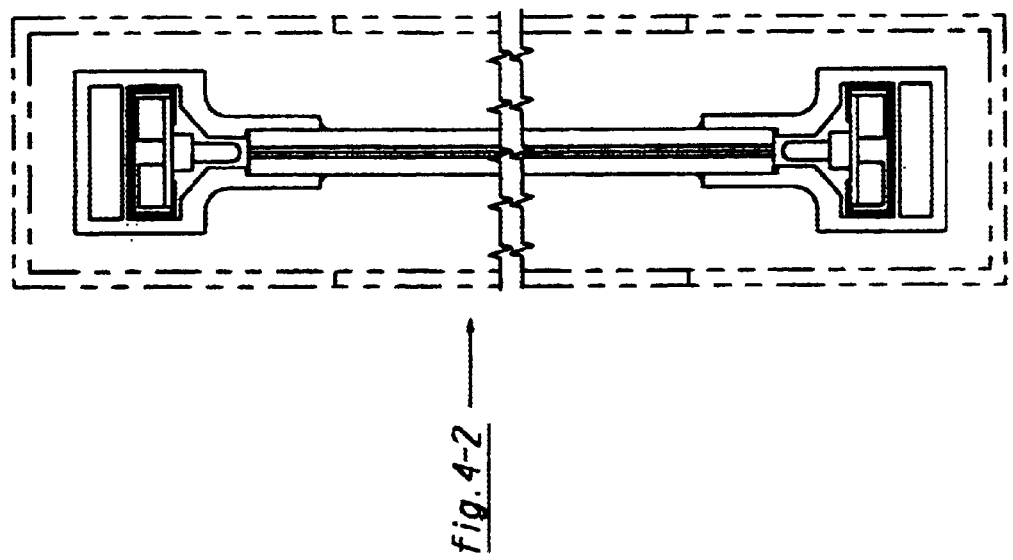
Figures 1, 4:
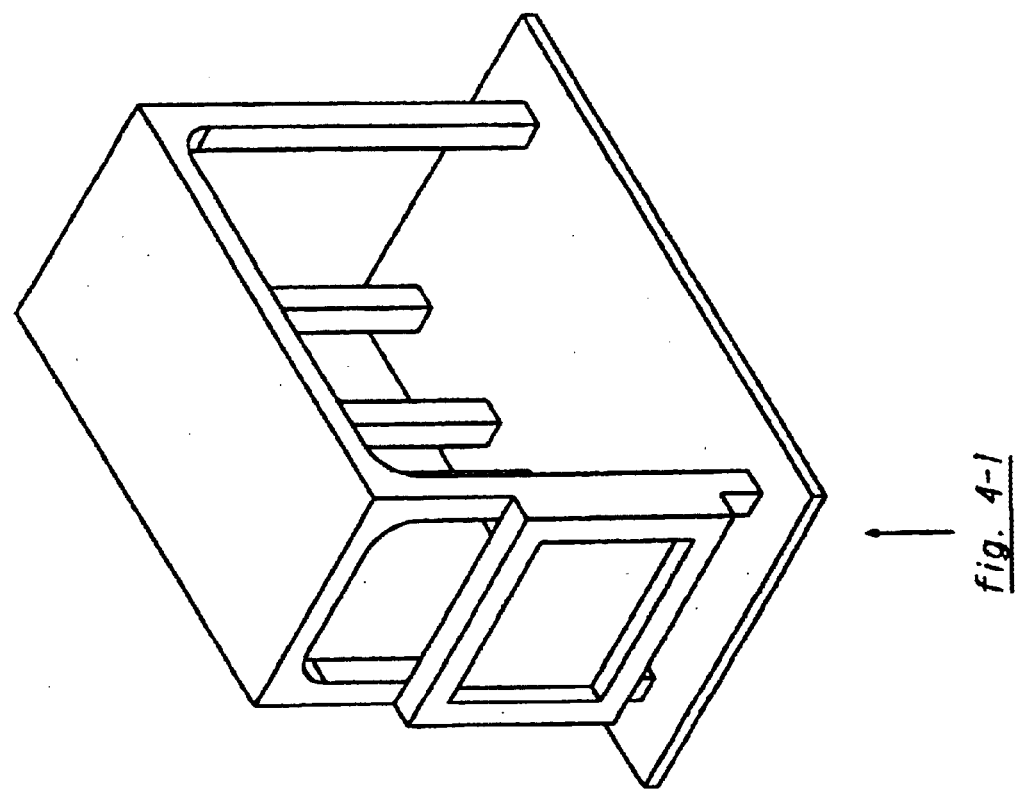

To reflect light in a more efficient manner an alternative system is shown in FIG. 3-4 and 3-5. Using an acrylic panel with indentations on one side (14) and applying a special reflective coating to the indented side (15) improves significantly the amount of light reflected.

What is claimed is:

1. A visual display unit comprising a housing, a reflective coating, a printed prismatic pattern increasing in size from two opposing edges, and a clear translucent acrylic panel.

2. The visual display unit according to claim 1 wherein said housing is an aluminum extrusion further comprising a light source.

3. The visual display unit according to claim 2 wherein said light source is a light emitting diode.

4. The visual display unit according to claim 2 wherein said housing is attached to a junction box.

5. The visual display unit according to claim 1 wherein said housing comprises at least one printed circuit board and at least one LED.

6. The visual display unit according to claimed 5 wherein said LED is embedded in the printed circuit board.

7. The visual display unit according to claim 1 wherein a sealant is between said housing and said panel.

8. The visual display unit according to claim 1 wherein said panel comprises at least one clear translucent acrylic panel.

9. The visual display unit according to claim 8 wherein said panel contains a prismatic printed pattern.

10. The visual display unit according to claim 8 wherein said panel includes a plurality of indentations to reflect light.

11. The visual display unit according to claim 10 wherein said indentations include a reflective coating.

12. A visual display unit comprising a housing wherein said housing includes conjoined edges and said housing includes at least one gasket sandwiched between said conjoined edges, wherein said housing further includes an LED light source, and said visual display unit includes a double or single sided clear translucent acrylic panel wherein said panel includes a reflective coating, a printed prismatic pattern increasing in size from two opposing edges, and at least one junction box attached to said housing.

* * * * *